(12) United States Patent
Schuetzle et al.

(10) Patent No.: US 12,152,203 B2
(45) Date of Patent: *Nov. 26, 2024

(54) CATALYSTS, RELATED METHODS AND REACTION PRODUCTS

(71) Applicant: Greyrock Technology, LLC, Sacramento, CA (US)

(72) Inventors: Robert Schuetzle, Sacramento, CA (US); Dennis Schuetzle, Grass Valley, CA (US)

(73) Assignee: Greyrock Technology, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/803,276

(22) Filed: Apr. 18, 2022

(65) Prior Publication Data

US 2022/0243131 A1    Aug. 4, 2022

Related U.S. Application Data

(63) Continuation of application No. 16/501,155, filed on Feb. 26, 2019, now Pat. No. 11,332,674, which is a
(Continued)

(51) Int. Cl.
 *C10J 3/00* (2006.01)
 *B01J 23/83* (2006.01)
(Continued)

(52) U.S. Cl.
CPC ............... *C10G 2/32* (2013.01); *B01J 23/83* (2013.01); *C01B 3/02* (2013.01); *C01B 3/36* (2013.01);
(Continued)

(58) Field of Classification Search
CPC .... C10G 2/32; C10G 2/34; B01J 23/83; B01J 2219/24; C01B 3/02; C01B 3/36;
(Continued)

(56) References Cited

U.S. PATENT DOCUMENTS

| 7,559,372 B2* | 7/2009 | Cobb | C09K 8/58 |
| | | | 166/300 |
| 2003/0153632 A1* | 8/2003 | Wang | C10G 2/32 |
| | | | 518/703 |

(Continued)

*Primary Examiner* — Huy Tram Nguyen
(74) *Attorney, Agent, or Firm* — McKinney Law Group APC; Jeffrey A. McKinney

(57) ABSTRACT

The present invention generally relates to improved catalysts that provide for reduced product contaminants, related methods and improved reaction products. It more specifically relates to improved direct fuel production and redox catalysts that provide for reduced levels of certain oxygenated contaminants, methods related to the use of those catalysts, and hydrocarbon fuel or fuel-related products that have improved characteristics. In one aspect, the present invention is directed to a method of converting one or more carbon-containing feedstocks into one or more hydrocarbon liquid fuels. The method includes the steps of: converting the one or more carbon-containing feedstocks into syngas; and, converting the syngas to one or more hydrocarbons (including liquid fuels) and a water fraction. The water fraction comprises less than 500 ppm of one or more carboxylic acids.

15 Claims, 3 Drawing Sheets

Related U.S. Application Data continuation of application No. 15/330,100, filed on Aug. 5, 2016, now Pat. No. 10,260,005.

(51) Int. Cl.
  *C01B 3/02* (2006.01)
  *C01B 3/36* (2006.01)
  *C01B 3/38* (2006.01)
  *C10G 2/00* (2006.01)
  *C10J 3/72* (2006.01)

(52) U.S. Cl.
  CPC ............... *C01B 3/38* (2013.01); *C01B 3/384* (2013.01); *C10G 2/34* (2013.01); *C10J 3/00* (2013.01); *C10J 3/72* (2013.01); *B01J 2219/24* (2013.01); *C01B 2203/0233* (2013.01); *C01B 2203/0255* (2013.01); *C01B 2203/0435* (2013.01); *C01B 2203/0465* (2013.01); *C01B 2203/062* (2013.01); *C01B 2203/1076* (2013.01); *C01B 2203/1082* (2013.01); *C10J 2300/0916* (2013.01); *C10J 2300/0946* (2013.01); *C10J 2300/1807* (2013.01); *C10J 2300/1846* (2013.01); *Y02E 50/30* (2013.01)

(58) Field of Classification Search
  CPC ... C01B 3/38; C01B 3/384; C01B 2203/0233; C01B 2203/0255; C01B 2203/0435; C01B 2203/0465; C01B 2203/062; C01B 2203/1076; C01B 2203/1082; C10J 3/00; C10J 3/72; C10J 2300/0916; C10J 2300/0946; C10J 2300/1807; C10J 2300/1846; Y02E 50/30; Y02P 20/52; Y02P 30/20
  USPC ........................................................ 422/625
  See application file for complete search history.

(56) References Cited

U.S. PATENT DOCUMENTS

| | | | |
|---|---|---|---|
| 2005/0131084 A1* | 6/2005 | Kohler | C02F 9/00 210/631 |
| 2007/0010590 A1* | 1/2007 | Abbott | C10G 2/32 518/703 |
| 2015/0247100 A1* | 9/2015 | Bradin | C10G 3/49 585/254 |

* cited by examiner

CATALYSTS, RELATED METHODS AND REACTION PRODUCTS

This application is a continuation of U.S. patent application Ser. No. 16/501,155, filed on Feb. 26, 2019, which is a continuation of U.S. patent application Ser. No. 15/330,100, filed on Aug. 5, 2016, and issued as U.S. patent Ser. No. 10/260,005 on Apr. 16, 2019, which are incorporated by reference for all purposes.

FIELD OF THE INVENTION

The present invention generally relates to improved catalysts that provide for reduced product contaminants, related methods and improved reaction products. It more specifically relates to improved direct fuel production and redox catalysts that provide for reduced levels of certain oxygenated contaminants, methods related to the use of those catalysts, and fuel or fuel-related products that have improved characteristics.

BACKGROUND OF THE INVENTION

The integrated conversion of gas-phase hydrocarbon resources into liquid hydrocarbons and fuels is typically comprised of six primary processes (A. de Klerk: Fischer-Tropsch (F-T) Refining, Wiley Verlag, 2012). These processes include: 1) syngas generation and purification; 2) catalytic conversion of the syngas to liquid hydrocarbons (fuels), catalyst reaction water, tailgas and wax; 3) separation and collection of the liquid hydrocarbons, catalyst reaction water and wax from the tailgas; 4) recycling of the tail gas for the production of additional syngas and/or for use as a burner fuel; 5) upgrading/refining of waxes to fuels and chemical products; 6) and purification and pre-treatment of the catalyst reaction water before recycling, reuse and/or disposal.

The relative proportions of the tail-gas, liquid hydrocarbons, catalyst reaction water and wax are dependent upon the type and formulation of the catalyst; syngas composition and purity; catalytic reactor type and design; and catalyst operating conditions.

Syngas can be produced from many types of carbonaceous resources, including natural gas, coal, biomass, or virtually any hydrocarbon feedstock using gasification or thermochemical conversion processes. Syngas generation is typically categorized as processes that 1) utilize oxygen or air or 2) processes that exclude oxygen or air.

Despite work that has been done in this area, there is still a need in the art for novel and improved catalysts, related methods and improved reaction products.

SUMMARY OF THE INVENTION

The embodiments of the present invention disclose improved processes that make the direct recycling of catalyst reaction water into hydrocarbon syngas generation processes possible without requiring water purification and other water pre-treatment methods described in the current art.

The improvements include 1) an improved direct fuel production catalyst that is synthesized using a substrate that has a neutral surface pH (e.g. the surface is neither acidic nor basic) and; 2) an improved redox catalyst that is used in tandem with the improved direct fuel production catalyst.

The combination of these innovations results in the production of catalyst reaction water that doesn't contain deleterious carboxylic acids and as a result the catalyst reaction water can be recycled directly to the syngas generation process.

This improved redox catalyst has been developed such that can be reduced (activated) and operated effectively at the same temperature, pressure and space velocity conditions as the improved direct fuel production catalyst.

As a result, the only oxygenated hydrocarbons present in the catalyst reaction water are non-corrosive hydroxy-alkanes (e.g. alcohols) which are efficiently reformed using catalytic and non-catalytic steam reforming processes.

These improvements significantly reduce and in many cases eliminate the need for the external input of purified water. In addition, a challenging and costly waste-water disposal problem is reduced or eliminated.

The direct catalytic reforming of the recycled catalyst reaction water containing hydroxy-alkanes helps reduce the ratio of hydrogen to carbon monoxide to the ideal stoichiometric $H_2/CO$ ratio of about 1.8-2.4/1.0.

In one aspect, the present invention is directed to a method of converting one or more carbon-containing feedstocks into one or more hydrocarbons (e.g., liquid fuels). The method includes the steps of: converting the one or more carbon-containing feedstocks into syngas; and, converting the syngas to one or more hydrocarbons (e.g., liquid fuels) and a water fraction. The water fraction comprises less than 500 ppm of one or more carboxylic acids.

In another aspect, the present invention is directed to a system for the direct conversion of syngas to hydrocarbons (e.g., liquid fuels). The system includes: a syngas generator comprising means for converting one or more carbon-containing feedstocks into syngas; a catalytic reactor comprising a conversion catalyst for the conversion of syngas into one or more hydrocarbons (e.g., liquid fuels) and a water fraction, wherein the conversion catalyst comprises a substrate, and wherein the substrate comprises a surface having a pH ranging from about 6.0 to about 8.0.

The tailgas, liquid fuel, catalyst reaction water and wax are separated 110 into four fractions. Since the catalyst water does not contain deleterious carboxylic acids, it can be directly recycled 112 to the syngas generator 103, or for other purposes such as secondary and tertiary oil recovery injection 119.

Figure 2:
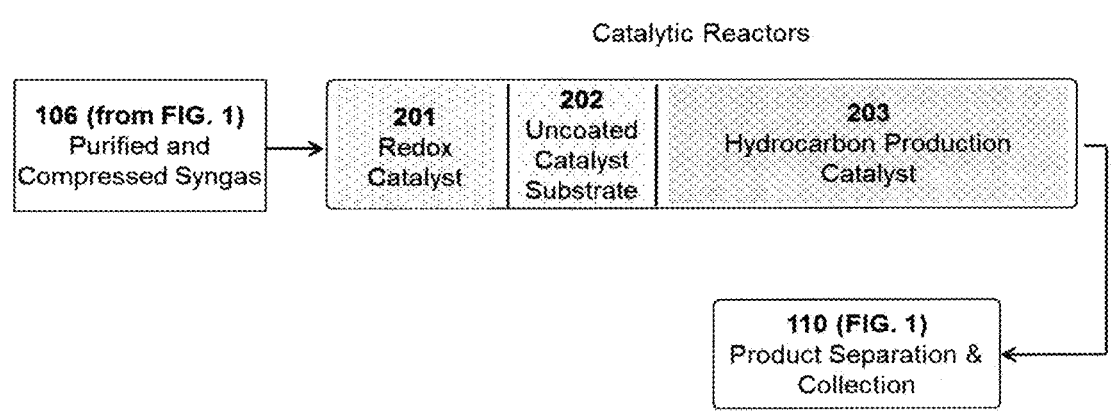

FIG. 2 illustrates an improved redox catalyst.

Figure 3:
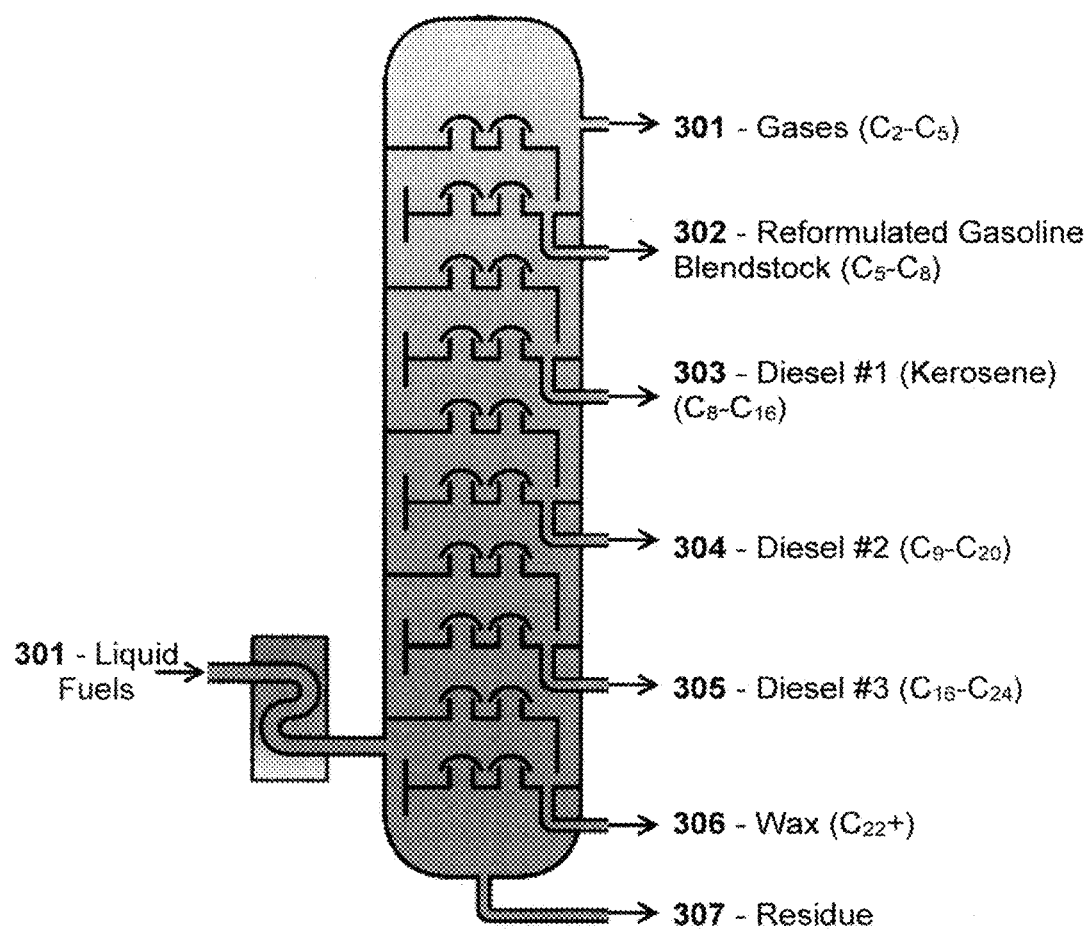

FIG. 3 illustrates the distillation of liquid fuels into premium fuel products.

DETAILED DESCRIPTION OF THE INVENTION

This invention relates to an improved process for the direct recycling of catalyst product water in a gas-to-liquids, biomass-to-liquids, coal-to-liquids, or other "XTL" process (where XTL refers to the conversion of any carbon containing material into liquid fuels). The formation of deleterious carboxylic acids in catalyst reaction water (and fuels) is eliminated when an improved direct liquid fuel production catalyst is utilized that is synthesized from substrates that have a neutral surface pH and other key properties. Also if oxygen levels in syngas are high an improved redox catalyst is used that reduces the concentration of oxygen in syngas by more than 95%. The innovations can be used independently or may be used in combination where the redox catalyst is used in tandem with the improved liquid fuel production catalyst and both catalysts are activated (reduced) and operated under similar conditions. Since harmful carboxylic acids are not formed, the catalyst reaction water can be recycled and used directly in syngas generation processes without the need for water purification processes that have been conventionally employed to remove deleterious carboxylic acids and other undesirable water contaminants before use.

Syngas Generation Processes that Utilize Oxygen

Syngas generation processes that utilize $O_2$ or air are typically referred to as direct conversion or partial oxidation (POX) processes. POX is carried out with sub-stoichiometric gaseous hydrocarbon/oxygen mixtures in reformers at temperatures in the 1,500-2,700° F. range. Praxair, Shell, ConocoPhillips and others have developed systems for the conversion of gaseous hydrocarbon resources into syngas using POX. Each of these systems uses an oxygen input, requiring pressurized oxygen to be delivered to the plant using one of the methods described above. As an example, the Praxair process utilizes a hot oxygen burner that is non-catalytic and converts natural gas (or other hydrocarbons) and oxygen into syngas as described in U.S. Pat. No. 8,727,767 (May 2014).

ConocoPhillips uses a catalyst in their thermochemical conversion system as described in U.S. Pat. No. 7,261,751 (August 2007). In commercial practice, steam is added to the POX reformer in order to minimize elemental carbon formation and help increase the $H_2/CO$ ratio as described in U.S. Pat. No. 6,942,839 (September 2005) by Shell.

There are some disadvantages with using POX for micro and small GTL plants:
1) Any POX process that uses oxygen requires the co-location of an oxygen production plant, and depending upon the oxygen generation method this oxygen may contain concentrations of other gases such as nitrogen and argon;
2) Additional unit operations are usually required to adjust the $H_2/CO$ to the ideal stoichiometric ratios of approximately 1.8-2.3;
3) Nitrogen present in the feedstock or present in the oxygen stream may produce $NH_3$ and HCN contaminants in the syngas stream which are potential catalyst poisons;
4) Nitrogen also dilutes the syngas requiring a scale-up of the thermochemical and catalytic processes;
5) The presence of unreacted oxygen in the thermochemical process can produce carboxylic acids in the syngas. Some of these carboxylic acids in the syngas can be transported through the catalysts and end up in the catalyst reaction water, liquid fuels and wax;
6) The presence of oxygen in the syngas can produce carboxylic acids during the catalytic conversion of syngas to hydrocarbon products, depending upon the chemical and physical properties of the catalyst employed and the concentration of the oxygen in the syngas and;
7) The presence of unreacted oxygen in the syngas can oxidize the reduced catalyst, rendering it less efficient for the production of fuels.

Autothermal Reforming (ATR) is another category of conversion technology that utilizes catalysts to produce syngas from gaseous hydrocarbons, oxygen and steam. Shell describes an ATR process in their U.S. patents WO2016016256 (February 2016) and WO2006037782 (April 2006). There are several disadvantages when using ATR: 1) the catalyst is costly and may have a limited lifetime; 2) the catalytic reformers are large and expensive; 3) a co-located oxygen production plant is needed which adds significant capital cost and can, in some cases, double the plant energy requirements and; 4) in some cases the $H_2/CO$ ratio may be too low or too high and additional unit processes are required for the separation of the hydrogen as required to decrease the $H_2/CO$ to the required stoichiometric ratio.

Some limited data is available on the concentration of oxygen in the syngas generated from gasification processes that use oxygen or air. Babcock and Wilcox found that residual oxygen in syngas generated from the gasification of solid-phase carbonaceous feedstocks with air was in the 4,000-6,000 ppm range (Treepower, 2016). However, residual oxygen in the syngas in some cases may be as high as 10,000 ppm (Yun, 2003).

It has been discovered that when oxygen is present during the thermochemical conversion of carbonaceous materials, the formation of contaminants, such as carboxylic acids, are increased significantly and that some of this oxygen may remain in the syngas depending upon the type of thermochemical conversion process and operating conditions (Schuetzle et al., 2015). The carboxylic acids are of particular concern since they can cause corrosion of metal surfaces and deactivate catalysts. These carboxylic acids can also elute through the catalytic reactor and become distributed in the fuel and catalyst reaction water products.

Syngas Generation Processes that Exclude Oxygen

The conversion of solid-phase and liquid-phase carbonaceous feedstocks to syngas, using steam in the absence of oxygen or air, is typically referred to as indirect thermochemical conversion.

Steam methane reforming (SMR) is a well-established method for the conversion of gas-phase hydrocarbons to syngas. Since methane is difficult to efficiently steam reform to syngas at temperatures below about 2,200° F., catalysts are typically employed to reduce the reforming temperature to about 1,600-1,700° F. This process is referred to as catalytic steam methane reforming (CSMR) and is very efficient for the reforming of other gas-phase hydrocarbons such as $C_2$-$C_{16}$ hydrocarbons and $C_1$-$C_{16}$ hydroxy-alkanes and $C_3$-$C_{16}$ ketones (Sa et al, 2010).

These non-oxidative processes produce syngas that typically has less than about 500-1,000 ppm of oxygen.

Effect of Contaminants on Catalysts

Table 2 summarizes some potential catalyst contaminants in syngas and their maximum recommended contaminant levels. Numerous methods are available in the current art for the removal of hydrogen sulfide, sulfur dioxide, ammonia, hydrogen cyanide, nitrogen oxides, hydrogen chloride and particulates in syngas. However, little attention has been paid to the removal of oxygen which is important since it has been discovered that oxygen levels above about 500 ppm in syngas generation processes significantly increases the formation of syngas contaminants (Schuetzle et al., 2015) and residual oxygen in the syngas will re-oxidize the reduced catalyst which decreases fuel production efficiency.

Deleterious carboxylic acids can be formed by the reaction of oxygen with free radicals during the catalytic conversion of the syngas with CO and $H_2$. The formation of these acids is dependent upon the concentration of oxygen in the syngas, the chemical and physical properties of the catalyst, and the operating conditions of the catalytic reactor. If carboxylic acids are formed, they will be approximately distributed between the liquid fuel, catalyst reaction water and wax as summarized in Table 3.

TABLE 2

Potential Catalyst Contaminants in Syngas and Their Maximum Recommended Levels for Current Catalysts for the Conversion of Syngas to Hydrocarbon Products

| Catalyst Contaminants | Maximum Recommended Contaminant Levels |
| --- | --- |
| Hydrogen Sulfide ($H_2S$) | <20 ppb |
| Sulfur Dioxide ($SO_2$) | <200 ppb |
| Ammonia ($NH_3$) | <5 ppm |
| Hydrogen Cyanide (HCN) | <20 ppb |
| Nitrogen Oxides (NOx) | <200 ppb |
| Hydrogen Chloride (HCl) | <35 ppb |
| Oxygen ($O_2$) | <500 ppb |
| Total Particulate Matter ($PM_{2.5}$) | <500 µg/m³ |

When these carboxylic acids are present in fuels, the fuel can corrode metal surfaces and fuel storage lifetime is reduced considerably. Therefore, these acids need to be removed (if present) from the fuel before distribution, storage and use, a process which is difficult and costly.

Concurrently, when these carboxylic acids are present in the catalyst reaction water, they need to be removed before the water can be recycled and used for plant processes. In addition to the problem of metal surface corrosion, these acids will damage the catalysts typically used in catalytic steam reforming processes.

TABLE 3

The Relative Distribution of Carboxylic Acids (if formed) in the Catalyst Reaction Water, Liquid Fuels and Wax

| | | Distribution (mole %) | | |
| --- | --- | --- | --- | --- |
| Carboxylic Acid | BP (° C.) | Water | Liquid Fuels | Wax |
| Methanoic (formic) | 101 | 100 | 0 | 0 |
| Ethanoic (acetic) | 118 | 100 | 0 | 0 |
| Propanoic | 141 | 75 | 25 | 0 |
| Butanoic | 164 | 30 | 70 | 0 |
| Pentanoic | 187 | 10 | 85 | 5 |
| Hexanoic | 205 | 5 | 80 | 15 |
| Octanoic | 239 | <1 | 75 | 25 |

Syngas Purification

Many techniques are available in the current art for the purification of syngas before catalytic conversion of the syngas to hydrocarbon products. The concentration of contaminants is dependent upon the type of thermochemical conversion process employed and the composition of feedstock (Schuetzle et al., 2015). The thermochemical conversion of gas-phase hydrocarbons produces much lower concentrations of syngas contaminants than the conversion of solid carbonaceous materials such as biomass, coal, municipal solid waste, and other solids. Sulfur compounds are the most prevalent contaminants in gas-phase hydrocarbon resources. These contaminants can be removed using a variety of solid-phase binding agents, such as iron oxide or zinc oxide.

Removal of Oxygen from Syngas

Very few methods are available for the removal of oxygen from syngas. The current art for the removal of oxygen from syngas is summarized in this section.

The typical commercial process for the removal of oxygen from industrial gas streams, such as $N_2$, Ar, He, Ne, etc., has been carried out by reaction with excess hydrocarbons ($CH_4$, $H_2$, etc.) in heated catalyst beds. This process produces water which is removed by drying the gas stream with adsorbents.

U.S. Pat. No. 6,744,066 (June 2004) describes a method for reducing oxygen in syngas and the use of the oxygen reduced syngas for the production of hydrocarbon products. They describe a catalyst, $\alpha Pt\text{-}\beta CeO_2\text{-}YAl_2O_3$, that promotes a reaction between the oxygen and carbon monoxide in the syngas stream that contains a lower concentration of oxygen as given by equation 1.

$$O_2 + 2CO = 2CO_2 \qquad \text{Eq. 1}$$

This catalyst is effective in reducing the concentration of oxygen in syngas when the oxygen is present in concentrations up to 1,000 ppm. However, the oxygen reduction efficiency of this catalyst is not reported. Since this catalyst reduces the concentration of CO, the production of hydrocarbon products will also be reduced.

U.S. Pat. No. 5,607,572 (March 1997) describes the utilization of a metal oxide coated on a high surface area substrate to remove oxygen from gas streams. The metal oxide is first reduced to its elemental (metallic) state with a reducing gas (e.g. $H_2$) in a separate process at high temperatures up to 1,500° C. The metal reacts with oxygen in the gas stream which produces the metal oxide. After a selected period, the metal oxide is re-reduced with $H_2$ at temperatures up to 1,500° C.

Catalytic Conversion of Syngas to Products

There is a significant body of prior art that describes the conversion of syngas to products. Several recent reviews adequately summarize and compare the strengths and weaknesses of these various syngas conversion process to fuels.

The two primary approaches for the catalytic conversion of syngas to fuels are: 1) catalytic conversion of the syngas to intermediate products (primarily wax), followed by costly wax upgrading and refining processes such as hydrocracking and; 2) direct catalytic conversion of the syngas to fuels that produce minimal wax [U.S. Pat. No. 8,394,862 (August 2013) and U.S. Pat. No. 9,090,831 (July 2015)].

All of the current medium and large, commercial scale GTL plants convert syngas to wax as the primary product. Refining/upgrading processes are then employed to produce fuels and other products from the wax. Since these refining processes are complex and expensive, fuel production costs can be increased by greater than 40% versus direct production approaches.

Medium and large plant designs that incorporate traditional F-T processes, that utilize wax hydrocracking and other expensive upgrading processes, are not economically viable for distributed plants that process smaller volumes of gas-phase hydrocarbons.

"Micro" GTL plants encompass processes that convert about 0.25-1.0 million scf/day of gas-phase hydrocarbons into about 25-100 barrels/day of liquid fuels. GTL plants that convert about 1.0-25 million scf/day of gas-phase hydrocarbons into about 100-2,500 barrels/day of fuel, are typically referred to as small-GTL plants.

Catalytic Reactors

There are several types of catalytic reactors that have been commercially deployed commercially for the catalytic conversion of syngas to hydrocarbon products.

Multi-tubular, fixed-bed catalytic reactors are comprised of many small diameter tubes that are used and contain catalyst. These tubes are enclosed inside a reactor shell in which water is circulated to remove the exothermic heat produced from the conversion of syngas to hydrocarbon products. The use of catalysts that produce heavy waxes may coat the catalyst resulting in a significant reduction in catalyst efficiency. These reactors are operated in a multi-pass mode with removal of the products after each pass and recycling of the unreacted syngas back to the catalytic reactors. Two to three passes through these reactors typically converts about 90 volume % of the CO to hydrocarbon products. Multi-tubular reactors can be effectively scaled down for use in small and micro scale GTL plants.

Slurry reactors employ finely-divided catalysts suspended in a liquid medium. Heat removal is carried out using internal cooling coils. The synthesis gas is bubbled through the liquid medium which also provides agitation of the reactor contents. The small catalyst particle size improves mass transfer of heat to the liquid medium. Separation of the wax products from the catalyst particles has been a problem but advanced separation processes have been developed and deployed successfully for large-scale plants. However, these separation processes are complex and expensive and therefore slurry reactors can't be effectively and economically scaled down for use in small and micro-scale GTL plants.

Micro-channel reactors consist of reactor cores that contain thousands of thin process channels that are filled with very small particle size catalysts. These reactor cores are interleaved with 0.1-10 mm channels that contain water coolant. Since the catalyst particles and channels are small, heat may be dissipated more quickly than traditional 25-40 mm tubular reactors.

Although CO conversion per pass may be higher in microchannel reactors, there are several potential difficulties: 1) They do not tolerate particulates very well resulting in clogging of the channels; 2) Mechanical pumping can generate a pulsating flow which causes problems; 3) The high area to volume ratio and the uniform residence time cannot easily be scaled easily from demonstration to commercial scale; 4) Corrosion can be a major problem due to the thin walls; 5) Since wax is the primary hydrocarbon product, the heavy wax fractions ($C_{50}$-$C_{100}$) can easily clog the micro-channels; 6) Only finely ground catalysts can be employed and not innovative catalysts that have specific shapes (e.g., trilobes), aspect ratios and dimensions; (7) achieving accurate temperature control in the fine channels is challenging. Some examples of art related to microchannel reactors are provided by U.S. Pat. Nos. 8,043,571; 7,744,829; 7,470,405; 7,404,936 (July 2008), and U.S. Patent Publications 2015/0259609 and 2014/0140896.

Conversion of Syngas to Waxes

Many catalysts and catalytic processes have been developed and deployed for the conversion of syngas to wax. These catalysts are typically referred to as Fischer-Tropsch (F-T) catalysts (Jahangiri et al., 2014).

U.S. Pat. No. 6,262,131 (July 2001) describes a structured F-T catalyst system and method that includes at least one structure having a catalytic surface, such catalytic surface having a linear dimension exceeding 20 mm, a void ratio exceeding 0.6, and a contour that causes non-Taylor flow when CO and $H_2$ pass through the structure. F-T catalysts, including iron and cobalt, are described in the patent.

U.S. Pat. No. 5,620,670 (April 1997) describes a catalytic process that converts syngas in an F-T synthesis reactor using promoted iron oxide catalyst slurry.

U.S. Pat. No. 4,499,209 (February 1985) describes an F-T catalyst prepared by impregnation of a silica carrier with a solution of zirconium and titanium, followed by calcination and other preparation steps.

These patents describe catalysts that produce high molecular weight hydrocarbon reaction products (e.g., wax) which require further processing, including hydro-processing and other upgrading processes, to produce diesel fuel or diesel blendstock.

Direct Conversion of Syngas to Liquid Fuels

The direct, efficient conversion of syngas to liquid fuels, instead of wax, eliminates the need for complex and expensive refinery processes for converting the wax to fuels. Examples of the current art related to direct production of liquid fuels from syngas are provided below.

U.S. Pat. No. 8,394,862 (August 2013) and U.S. Pat. No. 9,090,831 (July 2015) describe a unique process and catalyst that operates efficiently for the direct production of a high cetane diesel type fuel or diesel type blending stock from stoichiometric mixtures of hydrogen and carbon monoxide. This invention allows for, but is not limited to, the economical and efficient production of high quality diesel fuels from small or distributed fuel production plants that have an annual production capacity of less than 100 million gallons per year by eliminating traditional hydrocracking and other costly upgrading processes. This catalytic process is ideal for distributed diesel fuel production plants such as biomass to fuel production plants, stranded natural gas to diesel fuel production plants, flare gas conversion to fuels, and other applications that require optimized economics based on utilizing distributed feedstock resources.

The direct fuel production catalyst does not form carboxylic acids when the catalyst substrate surface is neutral or very close to being neutral (pH of between 6.0 and 8.0, ideally about 7.0). This is because an acidic surface is comprised of OH groups. For example, if the substrate is alumina, the surface composition is Al—OH. If the surface of alumina is neutral, the surface composition is Al—O—Al.

The surface acidity of the catalyst substrate can be easily measured. One preferred method employs measurement by a colorimetric titration with n-propyl amine using a methyl red indicator in which a neutral surface is defined as one for which the surface acidity is less than about 0.5 millimole per gram.

The OH groups on the acidic substrate (Al—OH) can react with alkoxy radicals (CHO*) to form acids as illustrated by Equation 2. It is well known that methyl radicals ($CH_3^*$) are abundant intermediates formed during the catalytic conversion of syngas. If $O_2$ is present in the syngas, it quickly reacts with $CH_3^*$ to form methoxy radicals ($HCO^*$) as given by Eq. 2. These methoxy radicals can then abstract the OH moiety from the surface of AlOH to from formic acid as illustrated by Eq. 3. Other acids (e.g. malonic, butyric, pentanoic, etc.) can be formed in a similar manner.

$$CH_3^* + O_2 = HCO^* + H_2O \quad \text{Eq. 2}$$

$$HCO^* + AlOH = HCOOH + Al^* \quad \text{Eq. 3}$$

The $Al^*$ then rapidly reacts with water to reform AlOH and hydrogen radicals $H^*$.

Alkoxy radicals can be formed with even very little $O_2$ present in the syngas. Even if some alkoxy radicals are formed, when the catalyst substrate surface is neutral, then organic acids will not be formed.

Two innovations can be used separately or in combination to eliminate the formation of organic acids during the catalytic conversion of syngas to hydrocarbon products. The first innovation involves the manufacture of catalysts using substrates that have a pH neutral surface (close to 7.0). The second innovation is the development of a novel, redox catalyst to reduce the oxygen in the syngas to very low levels (to less than 500-1,000 ppb).

Collection and Separation of Products

The product stream from the catalytic reactor is generally separated into the following fractions: tail gas; condensed liquid hydrocarbons, catalyst reaction water and waxes using a three-phase separator. The tail gas fraction is typically comprised of $H_2$, CO, $CO_2$ and $C_1$-$C_5$ hydrocarbons and oxygenated organic compounds; the condensed fraction comprises approximately $C_5$-$C_{24}$ hydrocarbons and oxygenated organic compounds; the wax fraction comprises approximately $C_{23}$-$C_{100}$ hydrocarbons and; the reaction water fraction is comprised of water with about 1.0-5.0 volume % of dissolved oxygenated organic compounds.

Since the catalytic conversion of syngas is typically 90-93% efficient when using tubular reactors with tail-gas recycling, some $H_2$ and CO will remain in the tailgas. In addition, the tail-gas contains some $CH_4$ which is produced from the catalytic reaction. The composition of the tail-gas is dependent upon the type of thermochemical process and operating conditions. This tail-gas can be recycled back to the thermochemical conversion system to produce additional syngas and/or it can be used as burner fuel.

Although virtually all catalytic processes described in the current art have been used to convert syngas primarily to wax, the improved catalyst described herein has been developed primarily to produce $C_5$-$C_{24}$ liquid hydrocarbons and very little wax ($C_{24}$+hydrocarbons [0 to 25 volume %]). Therefore, the improvement of this high liquid fuel, low wax production catalyst is an important centerpiece of this invention.

Purification of Catalyst Reaction Water Using Prior Art

There are numerous examples in the prior art that provide quantitative data on the concentrations of dissolved oxygenated organic compounds in catalyst reaction water. These dissolved oxygenated organic compounds are comprised primarily of hydroxy-alkenes (alcohols) and carboxylic acids with a combined concentration in the 0.5 to 5.0 volume % range, depending upon the thermochemical conversion process, the composition and purity of the syngas and the type of catalyst and catalytic process employed.

U.S. Pat. No. 8,999,164 describes the production of catalyst reaction water from the F-T catalysis of syngas in which the concentration of carboxylic acids in the water was found to about 9,000 ppm.

U.S. Patent Publication 2014/102981 reports the presence of carboxylic acids in catalyst reaction water at about 5,000 ppm in concentration.

U.S. Pat. No. 8,535,487 found that carboxylic acids were present at concentrations of 5,000-15,000 ppm in their catalyst process water when syngas was produced using a partial oxidation, steam reforming process.

U.S. Pat. No. 7,989,510 characterized the catalyst reaction water produced from a partial oxidation, catalytic steam reforming process and found that acids were present at concentrations of 5,000-15,000 ppm.

U.S. Pat. No. 7,153,432 describes the production of catalyst reaction water in which acids were found to be in the 750-12,000 ppm range.

U.S. Patent Publication 2003/106,351 describes the production of process water from the F-T catalysis of syngas in which carboxylic acids in the water fraction were found to range from 900 to 14,100 ppm.

If these carboxylic acids are formed during the thermochemical and/or catalytic processes, they will be distributed in the catalyst reaction water; the liquid fuels and wax as previously described in Table 3.

When these carboxylic acids are present in the catalyst reaction water, the water cannot be recycled directly into catalytic steam reforming process due to corrosion of metal surfaces and deactivation of the reforming catalysts. For this reason, numerous procedures have been developed and employed for purifying this water before use in thermochemical processes as well as for other purposes.

Such processes have included distillation, stripping, extraction, anaerobic digestion, biological oxidation, thermal oxidation, combinations thereof, and other water treatment processes.

U.S. Pat. No. 9,067,806 (June 2015) describes a process for the purification of an aqueous stream from the F-T catalysis of syngas comprising the following treatments: neutralization of the carboxylic acids with inorganic bases; evaporation, distillation and stripping; and treatment with at least one organic base. This purification process allows at least a part of the aqueous stream coming from the catalyst reaction water to be used as process water in the production plant.

U.S. Pat. No. 8,999,164 (April 2015) describes catalyst reaction water produced from the F-T conversion of syngas consisting of the following oxygenated organic compounds: $C_1$-$C_9$ hydroxy-alkanes (70 wgt %); $C_2$-$C_6$ organic acids (20 wgt %); salts of organic acids (2 wgt %); and ketones and aldehydes (8%). The concentration of the hydroxy-alkanes and organic acids in the water were found to be 48,000 ppm and 9,000 ppm, respectively. A process is described for the removal of the hydroxy-alkanes and organic acids by distillation. The fraction containing the carboxylic acids is treated using anaerobic biological processes.

U.S. Patent Publication 2014/102981 (April 2014) describes a process for the purification of an aqueous stream, produced from an F-T reaction, which comprises feeding the aqueous stream to one or more pervaporation units, obtaining an aqueous stream enriched in oxygenated organic compounds, and an aqueous stream enriched in water. The aqueous stream is feed to a synthesis gas production plant.

U.S. Pat. No. 8,591,737 (November 2013) describes treatment of catalyst reaction water from a biomass-to-liquid process, with this process comprising the production of synthesis gas from biomass and conversion of the synthesis gas into liquid hydrocarbons by a Fisher-Tropsch process. The catalyst reaction water is purified in common with waste waters from another industrial process to which the biomass-to-liquid process is integrated, such as in forestry, power and/or heat generation, waste incineration or a process in a petrochemical and/or oil refining industry. The biomass-to-liquid process and a co-located industrial process may have a common feed water process unit, a common cooling water process unit and a common waste water treatment unit. The waste water treatment process may comprise a biological purification process and the F-T process may utilize a cobalt catalyst. An integrated plant comprising a biomass-to-liquid plant and another industrial facility in which both plants are connected to a common waste water treatment facility is also described.

U.S. Pat. No. 8,535,487 (September 2013) refers to a process for purifying an aqueous stream from a F-T reaction that includes feeding the aqueous stream to a system that includes a distillation column equipped with a partial condenser and a total condenser, at least partially condensing the vaporized stream leaving the head of the distillation column and collecting a first distillate which is comprised of heavier by-products, totally condensing the remaining portion of the vaporized stream leaving the partial condenser and collecting a liquid stream which is returned to the distillation column as a reflux and removing a purified aqueous stream from the bottom of the distillation column.

U.S. Pat. No. 8,529,865 (September 2013) describes the treatment of catalyst reaction water by distillation and/or by stripping, to form an oxygenate-rich stream which comprises a reforming reactant and oxygenates originating from the product water. The oxygenates-rich stream is fed to a second syngas generator and converted under reforming conditions to form at least hydrogen.

U.S. Pat. No. 8,158,029 (April 2012) describes a method for the production of synthesis gas from coal, which includes producing an oxygen stream in an air separation unit and humidifying the oxygen stream by contacting it with a hot aqueous liquid to produce a humidified oxygen stream. The humidified, heated oxygen-containing stream is fed into a low temperature non-slagging gasifier, in which a carbonaceous material is being gasified, thereby producing synthesis gas which is used for F-T hydrocarbon synthesis. Purified water is primarily used for humidifying the oxygen stream with a minor makeup of catalyst water from the F-T process. The remaining catalyst reaction water is used as cooling water, and for other plant processes.

U.S. Pat. No. 8,057,578 (November 2011) describes a method for treating water, comprising contacting a first water effluent containing one or more thermally destructible contaminants, and one or more thermally indestructible contaminants with steam which provides a second effluent comprising the steam and at least a portion of the one or more thermally indestructible contaminants. The second effluent is treated within an acid recovery unit and the intermediate is treated with one or more oxidants to provide a third effluent. The one or more oxidants and at least a portion of the one or more thermally destructible contaminants are destroyed using one or more combustion processes.

U.S. Pat. No. 8,048,178 (November 2011) describes a waste water treatment process for treating waste waters produced from a biomass-to-liquid (BTL) process which utilizes an F-T process utilizing a cobalt catalyst for converting the synthesis gas into liquid hydrocarbons. The aqueous effluent produced in the BTL process is purified in a common waste water treatment process comprising a biological purification process with waste waters produced in a co-located process for producing pulp and/or paper.

U.S. Pat. No. 7,989,510 (August 2011) describes a process for the purification of catalyst reaction water by use of a fractionating distillation column and a stripping column. The separated oxygenated organics are sent to a thermochemical syngas generator for the production of additional syngas.

U.S. Pat. No. 7,323,497 (January 2008) describes a process that utilizes catalytic steam reforming followed by partial combustion with an oxygen containing gas to produce a reformed gas mixture. Water is separated from the reformed gas mixture to produce a dry gas. A Fischer-Tropsch type catalyst is used to synthesize hydrocarbons from the dry gas. The catalyst reaction water, that contains alcohols, aldehydes, ketones and carboxylic acids is "pretreated to reduce fouling or corrosion in the saturator and water heating exchanges, e.g. by passing the water through filters and/or adjusting the pH." Some of the purified water is used as steam to produce the reformed gas mixture.

U.S. Pat. No. 7,318,894 (January 2008) describes a method and system for treating catalyst reaction water that utilizes membrane processes, preferably in combination with anaerobic biological treatment, resulting in a water treatment process without the high production of biological solids.

U.S. Pat. No. 7,276,105 (October 2007) describes a method for separating water from an F-T product stream which comprises feeding an F-T product stream to a separation membrane, preferably a ceramic membrane, and recovering water vapor from the downstream permeate side of the membrane. The purified water is used to produce steam for a methane steam reformer. The oxygenated hydrocarbons in the concentrated permeate are destroyed using a thermal oxidizer.

U.S. Pat. No. 7,235,172 (June 2007) describes a process for producing olefins. Process water from a syngas reactor, hydroprocessing unit, water stripper, cooling unit, catalyst regenerator, catalyst activator, and fractionator containing oxygenates and a naphtha stream is fed into a steam cracker to produce a product stream that contains olefins. The water-soluble oxygenates (oxygen-containing organic compounds) includes organic acids, alcohols, aldehydes, ketones and esters.

U.S. Pat. No. 7,166,219 (January 2007) describes a process for obtaining purified water from catalyst reaction water produced by a F-T reaction which comprises: a first separation treatment in order to remove at least a part of the non-acid, oxygenated hydrocarbons present to obtain an aqueous stream enriched in water; a second step comprising a biological treatment in order to remove at least a part of the acids from at least a part of the first aqueous stream enriched in water to obtain a second aqueous stream enriched in water; followed by a third step which comprises a solid-liquid separation in order to remove at least some of the solid compounds from at least a part of the second aqueous stream enriched in water.

U.S. Pat. No. 7,153,432 (December 2006) describes a purification process for catalyst reaction water co-produced in a F-T reaction which comprises: (a) subjecting the water co-produced in the F-T reaction to distillation or liquid-liquid extraction in order to remove at least a part of the alcohols present in said water and produce a first stream enriched in water; and (b) subjecting said first stream enriched in water to a separation process with membranes which allows at least some of the solids in suspension to be removed together with some organic acids in order to obtain purified water. This separation process with membranes can be selected from the group comprising: micro-filtration, ultra-filtration, reverse osmosis and pervaporation.

U.S. Pat. No. 7,150,831 (December 2006) describes a process for obtaining purified water from the catalyst reaction water derived from an F-T reaction which comprises the following steps:

1) A first step comprising a separation treatment in order to remove at least a part of the non-acid oxygenated hydrocarbons present in the catalyst reaction water for obtaining a first aqueous stream enriched in water;

2) A second step comprising a liquid-liquid extraction in order to remove at least a part of organic acids from at least a part of said first aqueous stream enriched in water obtaining a second aqueous stream enriched in water;

3) A third step comprising a biological treatment in order to remove at least a part of the organic acids from at least a part of said second aqueous stream enriched in water obtaining a third aqueous stream enriched in water;

4) A fourth step comprising a solid-liquid separation in order to remove at least some of the solid compounds from at least a part of said third aqueous stream enriched in water.

U.S. Patent publication 2005/113,426 describes a method for utilizing Fisher-Tropsch catalyst reaction water, which includes routing the purified water from a distillation process to a saturator column. The steam generated from the saturator column is used to saturate a hydrocarbon gas stream for a synthesis gas production unit.

U.S. Pat. No. 7,147,775 (December 2006) describes a process for obtaining purified water from catalyst reaction water which is comprised of the following steps:

1) Biological treatment in order to remove at least a part of the dissolved oxygenated organic compounds to obtain an initial aqueous stream;
2) Solid-liquid separation to remove some of the solid compounds from the initial aqueous stream;
3) Removal of the dissolved salts of organic compounds using chemical oxidation, ultraviolet light, and adsorption/absorption processes (e.g. activated carbon) from the second aqueous stream;
4) Biological treatment in order to remove at least a part of the dissolved oxygenated organic compounds to obtain an initial aqueous stream;
5) Solid-liquid separation to remove some of the solid compounds from the initial aqueous stream;
6) Removal of dissolved salts of organic compounds using chemical oxidation, ultraviolet light, and adsorption/absorption processes (e.g. activated carbon) from the second aqueous stream.

U.S. Pat. No. 6,887,908 (May 2005) describes the use of thermal oxidation to remove the organics from catalyst reaction water. This invention utilizes the excess heat from the thermochemical process to vaporize the water to steam and thermally oxidize the organic contaminants. However, it well known to those proficient in thermochemical processes, that temperatures in excess of 1,600° F. would be required to convert these organic contaminants to syngas. Since the concentration of these organics is less than 5.0 mole %, the ratio of water to organic carbon would be more than 25/1, compared to the ideal ratio of 1.5-2.5/1.0 for thermal oxidation process. Therefore, this process would be energy intensive, not efficient and very costly.

U.S. Patent Application 2004/0262199 (December 2005) describes a method for feeding at least the fraction of the gaseous raw product or the product water to a distillation column at a feed tray; withdrawing a liquid stream from the distillation column from a tray located above the feed tray; separating the liquid stream into an aqueous phase and a non-acid chemicals-rich phase; and returning the aqueous phase to the distillation column at a tray below the tray from which the liquid stream was withdrawn.

U.S. Pat. No. 6,533,945 (March 2003) describes a method for treating water from a hydrocarbon synthesis reactor comprising mixing the catalyst reaction water with a solid combustible organic fuel to form slurry and gasifying this slurry in oxygen blown gasifiers to produce synthesis gas at temperatures up to 2,800° F. The catalyst reaction water contains hydroxy-alkanes (alcohols) and carboxylic acids.

U.S. Patent Publication 2003/1,065,351 describes catalyst reaction water from the F-T catalysis of syngas in which the hydroxy-alkanes and carboxylic acids in the water fraction were found to be 1.0-4.5 weight % and 0.09-1.41 weight %, respectively. The water is purified using primary biological treatment, followed by a secondary solid-liquid separation, and a final tertiary treatment step.

U.S. Pat. No. 5,053,581 (October 1991) relates to a process of recycling condensate from a hydrocarbon or alcohol synthesis, wherein the condensate comprises water and contaminants such as lower molecular weight hydrocarbons, alcohols, and other oxygenates. A hot gaseous mixture comprising $CH_4$ and steam is used to strip the contaminants from the condensate. The stripped contaminants, $CH_4$, and steam are separately recovered as a gaseous stream from the remaining purified water. The recovered $CH_4$ containing gaseous stream may be used in synthesis gas ($CO/H_2$) generation processes with the generated synthesis gas then being used in a hydrocarbon synthesis process to produce heavy hydrocarbons.

All of the above processes described in the art are complex, costly and several require large energy inputs. Therefore, the innovations are detailed in the following text which makes it possible to use catalyst reaction water directly without requiring purification and other pre-treatment processes.

Improved Direct Fuel Production Catalyst

The first aspect of the preferred embodiment is the incorporation of the improved direct fuel production catalyst 109b that has been formulated to directly produce premium liquid fuels and catalyst reaction water that does not contain deleterious carboxylic acids.

When the direct fuel production catalyst, described in U.S. Pat. No. 8,394,862 (August 2013) and U.S. Pat. No. 9,090,831 (July 2015) (both patents incorporated-by-reference into this document for all purposes), is manufactured using a substrate that has a neutral surface pH (e.g. a pH of about 7.0) and when the oxygen concentration in the syngas is less than approximately 500-1,000 ppm, carboxylic acids are not formed and not found (<25 ppm) in the catalyst reaction water and liquid fuel fractions.

The directly produced liquid fuels are non-corrosive, do not oxidize or degrade during storage, and can be stored for several years without change. Furthermore, the catalyst reaction water can be directly recycled 112 to the syngas generator 103 without any problems.

Improved Redox Catalyst for Removing Oxygen from Syngas

When oxygen is present in syngas at concentrations greater than 500 ppm, some carboxylic acids may be formed. Therefore, an improved catalyst was developed for removing oxygen that is present in syngas at levels above about 500 ppm.

Catalytic steam reforming has been selected as the preferred process for the conversion of gas-phase feedstocks to syngas since air or oxygen is not used in this process. Slow pyrolysis/steam reforming is the favored process for the production of syngas from solid-phase feedstocks since air is excluded (Schuetzle et al., 2005). If proper care to taken to exclude air from these processes, the syngas should contain less than about 250 ppm of oxygen.

Direct Recycling of Catalyst Reaction Water

The liquid fuels are separated using a three phase separator 110 into tailgas 111 ($C_1$-$C_4$ hydrocarbons, oxygenated hydrocarbons, $CO_2$, and unreacted $H_2$ and CO), catalyst reaction water 112, and liquid fuels 113 (primarily consisting of $C_5$-$C_{24}$ hydrocarbons and oxygenated organic compounds).

A small quantity of wax is also produced (primarily consisting of $C_{24}$-$C_{40}$ hydrocarbons). One embodiment of the invention will produce less than 25% wax by weight, preferably less than 5% wax by, and a preferred embodiment will produce less than 2% wax.

In some embodiments of the invention, the tailgas 111 may be recycled to the thermochemical syngas generator 103 where it can be converted into additional syngas or used as burner fuel.

Improved Re-cycling of Catalyst Reaction Water

The second aspect of the preferred embodiment is the direct recycling of the catalyst reaction water 112 to a syngas generation process that requires steam for efficient operation.

If a syngas generator is used which requires little or no steam, the catalyst reaction water can be used directly for secondary or tertiary oil recovery 119, and for other purposes such as steam production for power or for water needs from plants that are co-located with the facility. This innovation is made possible since the catalyst reaction water does not contain the deleterious carboxylic acids but contains hydroxy-alkanes (alcohols) which are excellent additives for secondary and tertiary oil recovery.

Local Use of the Liquid Fuel

The liquid fuel 113 can be used directly and locally in off road engines used in diesel generators, tractors, compressors, water pumps, farm equipment, construction equipment, etc.

Transport of the Liquid Fuel

The liquid fuel 113 can be collected and transported by truck and/or rail to a central location where it is distilled 115 into the premium fuel products 116 illustrated in FIG. 3 for distribution to local fuel markets.

The possible products from the distillation of the liquid fuel product 113 include: reformulated gasoline blendstocks (approximately $C_5$-$C_8$ hydrocarbons & oxygenated organic compounds) 302; diesel #1 (kerosene) (approximately $C_8$-$C_{16}$ hydrocarbons & oxygenated organic compounds) 303; diesel #2 304 (approximately $C_9$-$C_{20}$ hydrocarbons & oxygenated organic compounds); diesel #3 305 (approximately $C_{16}$-$C_{25}$ hydrocarbons & oxygenated organic compounds); and a small wax fraction 306 ($C_{24}$+hydrocarbons & oxygenated organic compounds). A small quantity of gases (air and $C_2$-$C_5$) 301 are produced as well as a little residue (primarily oxidized hydrocarbons) 307.

Alternative or additional processes may be used to further distill the liquid hydrocarbons to separate the high value alpha-olefins, n-paraffins, hydroxy-alkanes, or other high value products from the liquid fuels.

An alternative embodiment includes the direct introduction of the liquid fuels into a co-located crude oil pipeline 117 at an oil well head, wherein it is mixed with the crude oil for conveyance to an oil refinery and/or chemical processing plant. Since the liquid fuels have a much lower density and viscosity than crude oil, they serve to improve the flow of the oil through pipelines.

Catalysts for the production of methanol may be used in the improved catalytic reactor in tandem with the catalytic reactor 108 to produce an intermediate methanol feedstock that can be transported to a refinery and/or chemical plant for further processing into fuels and/or chemicals.

In some embodiments, in order to prevent coking and other undesirable reactions in some syngas generators 103, the water to feedstock carbon ratio is adjusted in the range of 1.5-3.0/1.0, and preferably 2.0-3.0/1.0.

Figure 1:
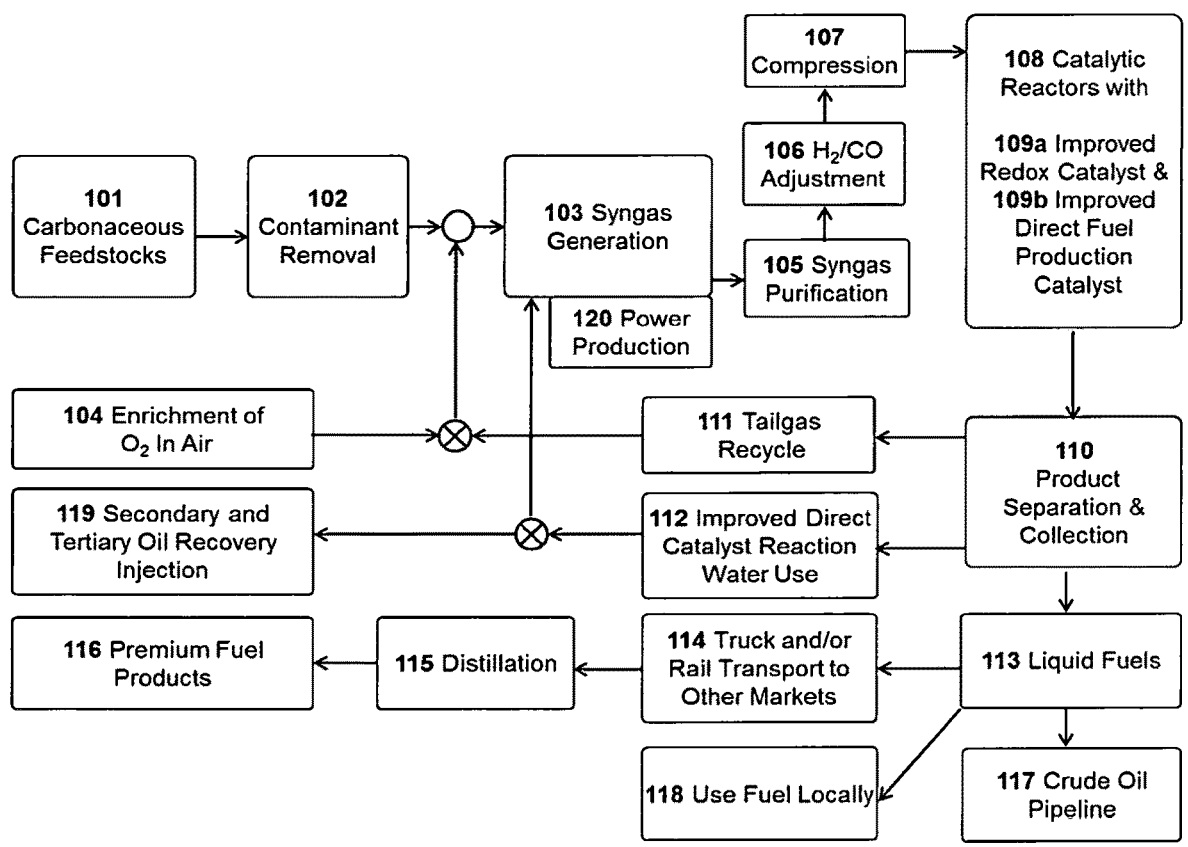
FIG. 1 illustrates a flowchart of a preferred embodiment of the distributed conversion process consisting of a process 102 for the removal of contaminants if the carbonaceous feedstock 101 is input as a gas; a syngas generator 103 for the production of syngas from the carbonaceous feedstocks; the removal of deleterious contaminants that may be present in the syngas 105; a process for adjusting the ratio of $H_2/CO$ in the syngas 106 if necessary; the compression of the syngas if required; the catalytic reactors (preferably a tubular design) 108; the improved redox catalyst for the removal of any oxygen in the syngas 109a which is integrated in the tubular catalytic reactors with the improved, direct fuel production catalyst 109b.

Although make-up water is needed when the integrated process described in FIG. 1 is started-up, there will be usually enough catalyst reaction water to maintain an efficient catalyst steam reforming process without the need for make-up water.

Production of Catalyst Reaction Water without Carboxylic Acids

Table 4 summarizes data for hydroxy-alkanes and carboxylic acids in catalyst reaction water produced from the catalysis of syngas that was generated by the steam reforming of natural gas, natural gas liquids and glycerol using the improved catalyst with the substrate that has neutral surface properties. Although, hydroxy-alkanes were found to be 12,831 ppm, 16,560 ppm and 18,877 ppm, respectively, for syngas generated from these three feedstocks—formic, acetic acid, propionic acid and malonic acid were not detected (detection limit of 25 ppm each) in the catalyst reaction water samples.

Since the hydroxy-alkanes and carboxylic acids are distributed between the catalyst reaction water and fuels, the possible presence of carboxylic acids in the liquid fuels can be easily determined by employing the ASTM D130 copper strip corrosion test. If carboxylic acids are present in the fuel, then the surface of the copper strip will change color for which a designation of 1a indicates no corrosion and does not contain carboxylic acids; to 4c where the fuel corrodes the copper strip to a dark brown/black color establishing that the fuel contains unacceptable levels of carboxylic acids (ASTM International, 2012).

It was found that the fuels produced directly from the feedstocks listed in Table 4 provided a 1a test result which confirmed that carboxylic acids were not present.

TABLE 4

The Concentration of Oxygenated Organic Compounds in Catalyst Reaction Water produced from Syngas derived from Various Gas-Phase Hydrocarbons using the Direct Fuel Production Catalyst

| Oxygenated Organic Compound | Gas-Phase Hydrocarbon Resource | | |
|---|---|---|---|
| | Natural Gas | Vaporized Natural Gas Liquids | Vaporized Glycerol |
| | Concentration (ppm) in Catalyst Reaction Water | | |
| Methanol | 4470 | 4980 | 6177 |
| Ethanol | 4890 | 5040 | 6529 |
| 1-Propanol | 1970 | 1930 | 2209 |
| 1-Butanol | 1980 | 2530 | 1888 |
| 1-Pentanol | 1080 | 1380 | 1342 |
| 1-Hexanol | 310 | 290 | 333 |
| 1-Heptanol | 111 | 60 | 67 |
| 1-Octanol | <25 | <25 | 122 |
| 1-Nonanol | <25 | <25 | <25 |
| Formic Acid | <25 | <25 | <25 |
| Acetic Acid | <25 | <25 | <25 |
| Propionic Acid | <25 | <25 | <25 |
| Malonic Acid | <25 | <25 | <25 |
| Total | 12,831 | 16,560 | 18,877 |

Direct Recycling and Use of Catalyst Reaction Water

Since the catalyst reaction water summarized in Table 4 does not contain detrimental carboxylic acids, it can be directly recycled to syngas generation and for other purposes without the requirement for pre-treatment and purification.

If the syngas production processes do not require much steam, such as for a partial oxidation reformer (POX), this catalyst reaction water may be used for the secondary or tertiary recovery of additional oil from nearby oil wells or other water needs as described herein.

When oil is present in subterranean rock formations such as sandstone, carbonate, or shale, the oil can generally be exploited by drilling a borehole into the oil-bearing formation and allowing existing pressure gradients to force the oil up the borehole. This process is known as primary recovery. If and when the pressure gradients are insufficient to produce oil at the desired rate, it is customary to carry out an improved recovery method to recover additional oil. This process is known as secondary recovery.

Even after secondary recovery using water injection, large quantities of the original oil may remain in place. The fraction of unrecoverable hydrocarbon is typically highest for heavy oils, tar, and complex formations. In certain large oil fields, more than a billion barrels of oil can be left after conventional water injection.

Tertiary recovery then becomes the focus. It is estimated that current tertiary oil recovery techniques have the ability to remove an additional 5 to 20 percent of oil remaining in a reservoir. The development of effective tertiary oil recovery strategies for higher oil recovery promises to have a significant economic impact. Current methods of tertiary recover are effective, but expensive since many oil producing locations have limited supplies of water.

It has been discovered that hydroxy-alkanes (alcohols), comprised of one to four carbons dissolved in water, are ideal for tertiary oil recovery [U.S. Pat. No. 7,559,372 (July 2009)]. However, the addition of mixed alcohols to local water sources for tertiary oil recovery is very costly.

Since the catalyst reaction water, produced from the improved catalyst described in this document, contains up to 2.0 volume % of $C_1$-$C_5$ alcohols, it is ideal for direct use in tertiary oil recovery.

An improved process is described for the production of liquid fuels from syngas that employs the direct recycling of catalyst reaction water to syngas production processes without requiring water purification or other complex and costly pre-treatment procedures. This improvement is made possible by the discovery and incorporation of innovative technologies that eliminate the production of deleterious carboxylic acids that are produced by catalysts that convert syngas to hydrocarbon products when the syngas contains oxygen. These technologies include (1) the development of an improved, direct liquid fuel production catalyst that is prepared from substrates that have a neutral surface pH and other key properties and; (2) an improved redox catalyst that efficiently removes oxygen in syngas. Since these innovations each prevent the formation of carboxylic acids during the catalytic conversion of syngas, these acids are not found in the catalyst reaction water and liquid fuels. As a result, the water can be directly recycled and used without adverse effects for syngas production processes. This improved, direct water recycling process eliminates the need for disposal, purification or treatment of the catalyst reaction water and significantly reduces fresh water requirements for syngas to liquid fuel production plants. Since carboxylic acids are not formed during the catalytic conversion of syngas, these acids are also eliminated from the directly produced fuel. As a result, the fuel is not corrosive and doesn't degrade during storage.

FIG. 1 represents the primary unit processes for a preferred embodiment of the invention.

Gas-phase, liquid-phase and solid-phase carbonaceous feedstocks can be converted to syngas using various thermochemical conversion processes. Many liquids can be vaporized and input as gas-phase feedstocks. If the liquid-phase feedstock is difficult to vaporize, it can be input as an aerosol. If the feedstock contains both volatile liquid and non-volatile solid-phase materials, the procedures used for feedstock introduction become more challenging.

Gas-phase feedstocks can include natural gas, bio-gas, associated gas, flare gas, gas phase hydrocarbons (for example $C_2$-$C_4$) Y-grade mix or natural gas liquids (NGL) mix, individual components extracted from natural gas streams such as ethane, propane, butane, or others, natural gas condensates ($C_{5+}$), or other similar gases or liquids (such as naphtha or condensate) that can be easily vaporized into a gas.

Liquid-phase feedstocks may include glycerol by-products from biodiesel production; residual hydrocarbon wastes from petroleum refining; waste fats (lipids), used oils and many other low-value liquid hydrocarbon resources.

Solid-phase feedstocks include plastics; agriculture residues; forest remediation wood; plastics (non-chlorine containing) and other low-value solid carbonaceous resources.

Gas-Phase Feedstocks

When gas-phase feedstocks are used, contaminants such as sulfur compounds can be removed 102 before the resource is input to the syngas generator 103. The preferred syngas generator 103 employs a catalyst which efficiently converts gas-phase hydrocarbons to syngas at operating temperatures below about 1,700° F. Enough steam is input to the syngas generator to maintain a steam to carbon mass ratio of about 2.0-3.0. The catalyst reaction water 112 is used directly to produce steam for this process. In some cases, a small quantity of make-up water may be needed. This process is typically referred to as catalytic steam reforming.

Elimination of Oxygen from Syngas

Many syngas generation processes utilize oxygen for the production of syngas which results in the presence of residual oxygen in the syngas. In other cases, small quantities of air are co-fed with feedstocks, some of which is transferred to the syngas. Additional sources of oxygen in syngas arise from the introduction of air when feedstocks are fed into a syngas generator, and the introduction of air during water scrubbing processes used to removed particulates and tars from the syngas.

Since the presence of oxygen in the syngas has adverse effects on the catalytic conversion of the syngas to fuels, such as the production of deleterious carboxylic acids and oxidation of syngas conversion catalysts, it is important to reduce the oxygen in syngas to very low levels.

In order to reduce oxygen levels to less than 1,000 ppm, an improved redox catalyst 109a (FIG. 1) and 201 (FIG. 2) was developed.

This innovative redox catalyst consists of a copper lanthanide material coated on a high-surface area substrate. This redox type catalyst is compatible for integrated use with Fischer Tropsch catalysts, direct fuel production catalysts (U.S. Pat. Nos. 8,394,862 and 9,090,831), and other catalysts that produce catalyst reaction water. This improved redox catalyst has been developed to function at the same temperatures, pressures and space velocities as the hydrocarbon production catalysts 203 (FIG. 2).

The improved redox catalyst 201 contains about 2-25 parts-by-weight of copper and up to 0.5 parts-by-weight of Lanthanides (preferably Lanthanum) per 100 parts-by-weight coated on a high-surface area support selected from a group consisting of silica, alumina, carbon nanotubes, and/or combinations thereof.

At typical catalyst operating temperatures of 400-450° F., the copper in the redox catalyst quickly reacts with any molecular oxygen and hydrogen in the syngas to produce water without affecting the carbon monoxide as shown by Equations 6 which is the combination of Equations 4 and 5. Since the reaction of oxygen with the redox catalyst is exothermic, an un-coated catalyst substrate may be added 202 after the redox catalyst 201 to dissipate this heat, thus protecting the hydrocarbon production catalysts from possible thermal damage.

$$2Cu+O_2=2CuO \quad \text{Eq. 4}$$

$$2CuO+2H_2=Cu+H_2O \quad \text{Eq. 5}$$

$$O_2+H_2=H_2O \quad \text{Eq. 6 (Eqs. 4\&5 combined)}$$

At the catalytic reactor operating temperature of about 400-450° F., the copper oxides are reduced back to copper with $H_2$ in the syngas to produce water as shown by Equation 7. In this manner, the Cu/CuO functions as a redox catalyst to eliminate oxygen from the syngas.

$$CuO_2+H_2=Cu+H_2O \quad \text{Eq. 7}$$

When oxygen is sufficiently reduced from syngas, carboxylic acids are minimized by some Fischer-Tropsch catalysts that primarily produce wax and catalyst reaction water. In addition, the efficiency of hydrocarbon production is improved since these reduced catalysts are not re-oxidized with oxygen.

The advantages of this redox catalyst 201, when operated in tandem with hydrocarbon production catalysts 203, are: 1) the redox catalyst and hydrocarbon production catalysts may utilize similar substrates; 2) similar preparation procedures can be used to prepare the catalysts; 3) the redox catalysts and hydrocarbon production catalysts are loaded in tandem within the catalytic reactors 200; 4) the procedures and conditions used for activating (reducing) the redox catalysts and hydrocarbon production catalysts with hydrogen are identical and; 5) the catalysts can be efficiently operated under the same conditions of temperature, pressure and space velocity during the production of the hydrocarbon products.

Another aspect of the preferred embodiment is the direct recycling of the catalyst reaction water 112. This innovation is made possible since the catalyst reaction water does not contain deleterious carboxylic acids.

In some embodiments of the invention, the catalyst reaction water 112 is directly recycled to the syngas generator 103 wherein the hydroxy-alkanes in the catalyst reaction water are converted into additional syngas. In other embodiments of this invention, the catalyst reaction water can be recycled to a steam boiler, where in conjunction with other water sources, steam is created as an input for the syngas generation process.

When this improved process, that allows for direct recycling of the catalyst reaction water, is used with the improved liquid fuel production catalysts, the primary liquid fuel product can be used directly or distilled 300 (FIG. 3) into the desired products 301-305 for distribution to different fuel markets.

The potential products from the distillation include: reformulated gasoline blendstocks or naphtha range products (approximately $C_5$-$C_8$ hydrocarbons & oxygenated organic compounds) 302; diesel #1 (kerosene) 303; diesel #2 304; diesel #3 305; and a small wax fraction 306. A small quantity of gases ($C_2$-$C_4$) 301 is produced as well as a little residue. Alternative or additional processes may be used to further distill the liquid hydrocarbons to produce high value alpha-olefins, n-paraffins, solvents, lube oils, hydroxy-alkanes, and/or other high value products.

When this improved, redox catalyst is used in tandem with a typical Fischer-Tropsch catalyst (De Klerk, 2012) that primarily produces wax, the wax can be refined to liquid fuels and other hydrocarbon products using wax upgrading and/or refinery type processes.

In another embodiment, catalysts for the production of mixed alcohols may be used in the improved catalytic reactor 108, wherein these mixed alcohols can be transported to a refinery and/or chemical plant for further processing into fuels and/or chemicals.

In yet another embodiment, catalysts for the production of methanol may be used in the catalytic reactor 108 to produce an intermediate methanol feedstock that can be transported to a refinery and/or chemical plant for further processing into fuels and/or chemicals.

In some embodiments, in order to prevent coking and other undesirable reactions in the thermochemical syngas generator 103, the water to feedstock carbon ratio is adjusted in the range of 1.0-3.0/1.0, and preferably 2.0-3.0/1.0 to prevent coking (carbon formation) and other undesirable reforming reactions.

Although make-up water is needed when the integrated process described in FIG. 1 is started-up, there will typically be enough catalyst reaction water to maintain an efficient catalyst steam reforming process without the need for very much make-up water.

The foregoing descriptions of embodiments for this invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the attached claims.

Several examples of the embodiments are provided showing the effect of the directly recycled catalyst reaction water on syngas composition.

Although the thermal steam reforming of methane should ideally produce a $H_2/CO$ ratio of 3.0/1.0 according to the reaction in Eq. 8, additional $H_2$ is produced from some of the methane according to Eq. 9, resulting in the reaction stoichiometry given by Eq. 10.

$$CH_4 + H_2O = CO + 3H_2 \qquad \text{Eq. 8 (major)}$$

$$0.20 CH_4 + 0.3 H_2O = 0.1 CO_2 + 0.1 CO + 0.7 H_2 \qquad \text{Eq. 9 (minor)}$$

$$1.2 CH_4 + 1.3 H_2O = 1.1 CO + 0.1 CO_2 + 3.7 H_2 \qquad \text{Eq. 10 (Eqs. 8\&9 combined)}$$

As a result, the ratio of $H_2/CO$ generated from a methane steam reformer is typically greater than 3.0 (Norbeck et al, 2008). As shown by equation 3, the ratio of $H_2/CO$ is 3.36.

The required molar ratio of $H_2O$ to carbon should be at least 1.44 according to equation 3, but preferably in the range of 2.0-3.0 to eliminate the possibility of elemental carbon formation.

Since the catalyst water, containing hydroxy-alkanes, is recycled to the syngas generator, the alcohols reduce the $H_2/CO$ ratio. Equations #11, #12 and #13 illustrate the reaction products and resulting product stoichiometry from the reforming of methanol, ethanol and propanol as examples.

$$CH_3OH + H_2O = CO + 2H_2 + H_2O \qquad \text{Eq. 11}$$

$$CH_3CH_2OH + 2H_2O = 2CO + 4H_2 + H_2O \qquad \text{Eq. 12}$$

$$CH_3CH_2CH_2OH + 3H_2O = 3CO + 6H_2 + H_2O \qquad \text{Eq. 13}$$

In this case, the reforming of these hydroxy-alkanes produce syngas with an $H_2/CO$ ratio of 2.0/1.0 which helps adjust the $H_2/CO$ ratio of the syngas within the desired 1.8-2.4 range.

REFERENCES CITED

The references presented in this document are summarized as U.S. Patents; U.S. Patent Publications; Foreign Patents and articles in journals and books.

US Patents

U.S. Pat. No. 9,138,688 B2, issued September 2015 to Prakash et al.
U.S. Pat. No. 9,090,831 B2, issued July 2015 to Schuetzle et al.
U.S. Pat. No. 9,067,806 B2, issued June 2015 to Camelli et al.
U.S. Pat. No. 8,999,164 B2, issued April 2015 to Franzosi et al.
U.S. Pat. No. 8,727,767 B2, issued May 2014 to Watson et al.
U.S. Pat. No. 8,591,737 B2, issued November 2013 to Kukkonen et al.
U.S. Pat. No. 8,535,487 B2, issued September 2013 to Camelli et al.
U.S. Pat. No. 8,529,865 B2, issued September 2013 to Belt et al.
U.S. Pat. No. 8,394,862 B2, issued August 2013 to Schuetzle et al.
U.S. Pat. No. 8,293,805 B2, issued October 2012 to Khan et al.
U.S. Pat. No. 8,158,029 B2, issued April 2012 to Ernst et al.
U.S. Pat. No. 8,057,578 B2, issued November 2011 to Argawal et al.
U.S. Pat. No. 8,048,178 B2, issued November 2011 to Smit et al.
U.S. Pat. No. 8,043,571 B2, issued October 2011 to Dannoux et al.
U.S. Pat. No. 7,989,510 B2, issued August 2011 to Locatelli et al.
U.S. Pat. No. 7,939,953 B2, issued May 2011 to Lomax et al.
U.S. Pat. No. 7,744,829 B2, issued June 2010 to Brophy et al.
U.S. Pat. No. 7,559,372 B2, issued July 2009 to Cobb
U.S. Pat. No. 7,470,405 B2, issued November 2008 to Knopf et al.
U.S. Pat. No. 7,404,936 B2, issued July 2008 to Mazanec et al.
U.S. Pat. No. 7,323,497 B2, issued January 2008 to Abbot
U.S. Pat. No. 7,318,894 B2, issued January 2008 to Juby et al.
U.S. Pat. No. 7,276,105 B2, issued October 2007 to Pruet et al.
U.S. Pat. No. 7,261,751 B2, issued August 2007 to Dutta et al.
U.S. Pat. No. 7,235,172 B2, issued June 2007 to Lawson et al.
U.S. Pat. No. 7,166,219 B2, issued January 2007 to Kohler et al.
U.S. Pat. No. 7,153,432 B2, issued December 2006 to Kohler et al.
U.S. Pat. No. 7,150,831 B2, issued December 2006 to Kohler et al.
U.S. Pat. No. 7,147,775 B2, issued December 2006 to Kohler et al.
U.S. Pat. No. 7,108,070 B2, issued September 2006 to Hall et al.
U.S. Pat. No. 6,942,839 B2, issued September 2005 to Huisman et al.
U.S. Pat. No. 6,887,908 B2, issued May 2005 to Pruet et al.
U.S. Pat. No. 6,744,066 B2, issued June 2004 to Wang et al.
U.S. Pat. No. 6,533,945 B1, issued March 2003 to Shah et al.
U.S. Pat. No. 6,262,131 B1, issued July 2001 to Arcuri et al.
U.S. Pat. No. 6,225,358 A, issued May 2001 to Kennedy et al.
U.S. Pat. No. 5,620,670 A, issued April 1997 to Benham et al.
U.S. Pat. No. 5,053,581 A, issued October 1991 to Hildinger et al.
U.S. Pat. No. 4,499,200 A, issued February 1985 to Hoek et al.

US Patent Publications

2015/0259609 A1, published September 2015, Wang et al.
2014/0144397 A1, published May 2014, Bromberg et al.

2014/102981 A1, published April 2014, Miglio et al.
2014/0140896 A1, published May 2014, Moon et al.
2005/113426 A1, published November 2005, Clur et al.
2005/0106086 A1, published May 2005, Tomlinson et al.
2003/0225169, published December 2003, Yetman.

Other Patent References

WO2012/158536 A1, published November 2012, Boel et. al.
WO2010/06958 A1, published June 2010, Carnelli et. al.
WO2009/0901005 A1, published July 2009, Carnelli et. al.
WO2006/037782 A1, published April 2006, Scholten et. al.
WO2005/113426 B1, published December 2005, Clur et. al.
WO2004/096952 A1, published November 2004, Abbott et. al.
WO2003/106346 A1, published December 2003, Dancuart.

JOURNAL AND BOOKS

Asadullah, M.: Biomass gasification gas cleaning for downstream applications: A comparative critical review. Renewable and Sustainable Energy Reviews 40, 118-131 (2014).

ASTM International, Standard test method for corrosiveness to Copper from petroleum products by Copper Strip Test, ASTM D130-12, Conshohocken, PA (2012).

De Klerk, A.: Fischer-Tropsch (F-T) refining. Wiley Verlag, Weinheim, Germany, 1-642 (2012).

Hoekman, S. K. et al.: Characterization of trace contaminants in syngas from the thermochemical conversion of biomass. Biomass Conversion and Biorefinery 3, 113-126 (2013).

Jahnagiri, H., Bennett, J., Mahjoubi, P., Wilson, K., Gu, S.: A review of advanced catalyst development for Fischer-Tropsch synthesis of hydrocarbons from biomass derived syngas. Catalysis Science and Technology 4, 2210-2229 (2014).

Lin, H., Zhou, M., Ly, J., Vu, J., Wijmans, J. G., Merkel, T. C., Jin, J., Haldeman, A., Wagener, E. H., Rue, D.: Membrane-Based Oxygen-Enriched Combustion, Ind. Eng. Chem. Res., 52, 10820-10834 (2013).

Lim, E. G. et al.: The engine reformer: syngas production in an engine for compact gas-to-liquid synthesis. Canadian Journal of Chemical Engineering 34 (2016).

McKendry, P.: Energy production from biomass gasification technologies 83, 55-63 (2002).

O'Brien, R. J., Davis, B. H.: Impact of copper on an alkali promoted iron Fischer-Tropsch catalyst. Catalysis Letters 64 (2004).

Sa, S., Silva, H., Brandao, L., Mendes, A.: Catalysts for methanol steam reforming. Applied Catalysis B Environmental 99, 43-57 (2010).

Schuetzle, D. et al.: The effect of oxygen on formation of syngas contaminants during the thermochemical conversion of biomass. International Journal of Energy and Environmental Engineering, Springer-Verlag GmbH, Berlin, Heidelberg, Online ISSN: 2251-6832 and Print ISSN: 2008-9163, 1-13 (2015).

Treepower: The Chemical Composition of Syngas from Biomass and Coal (http://www.treepower.org/fuels/biomasssyngas.html) (2016).

Wang, X.et al.: Dilution sampling and analysis of particulate matter in biomass-derived syngas. Frontiers of Environmental Science & Engineering 5, 320-330 (2011).

Yan, Qiangu et al.: Catalytic removal of oxygen from biomass-derived syngas. Bioresource Technology 147, 117-123 (2013).

Yaying, J.: Partial oxidation of methane with air or $O_2$ and steam to synthesis gas over a Ni-based catalyst. Journal of Natural Gas Chemistry 9, 291-303 (2000).

Yun, Y. et al.: Syngas Quality in Gasification of High Moisture Municipal Solid Waste. Am. Chem. Soc., Div. Fuel Chem. 2003, 823-24 (2003).

What is claimed is:

1. A method of converting one or more carbon-containing feedstocks into one or more hydrocarbons comprising:
   a) converting the one or more carbon-containing feedstocks into syngas;
   b) converting the syngas to one or more hydrocarbons and a water fraction wherein the water fraction comprises less than 500 ppm of one or more carboxylic acids, and wherein the water fraction comprises $C_1$-$C_5$ alcohols, and where a conversion catalyst is used to convert the syngas to one or more hydrocarbons and a water fraction, and wherein the conversion catalyst comprises a substrate, and wherein the substrate comprises a surface having a pH ranging from 6.0 to about 8.0.

2. The method according to claim 1, wherein the one or more carbon-containing feedstocks are selected from a group consisting of: gas-phase feedstocks; liquid-phase feedstocks; and, solid-phase feedstocks.

3. The method according to claim 1, wherein the one or more carboxylic acids are selected from a group consisting of: methanoic acid; ethanoic acid; propanoic acid; butanoic acid; pentanoic acid; hexanoic acid; and octanoic acid.

4. The method according to claim 1, wherein the one or more carbon-containing feedstocks are converted into syngas using syngas generation, thereby producing syngas with greater than 1,000 ppm oxygen, and wherein at least a portion of the oxygen in the syngas is reduced using a redox catalyst, thereby producing syngas with less than 250 ppm oxygen.

5. The method according to claim 1, wherein the water fraction comprises less than 100 ppm of one or more carboxylic acids.

6. The method according to claim 1, wherein the one or more carbon containing feedstocks are converted into syngas using syngas generation, and wherein the syngas is produced with greater than 250 ppm oxygen, and wherein the oxygen in the syngas is reduced using a redox catalyst, and wherein the syngas converted to one or more liquid fuels and a water fraction using a conversion catalyst, and wherein the water fraction comprises less than 25 ppm carboxylic acids.

7. The method according to claim 1, wherein the water fraction is recycled back to the syngas generation, and wherein the water is not treated to remove one or more carboxylic acids, and wherein the C1-C5 alcohols are converted into additional syngas.

8. The method according to claim 1, wherein the water fraction is used for secondary or tertiary oil recovery, and wherein the water is not treated to remove one or more carboxylic acids.

9. The method according to claim 1, wherein the one or more hydrocarbons produced from the conversion of syngas comprises less than 25 percent wax.

10. The method according to claim 2, wherein the one or more carbon-containing feedstocks are one or more gas-phase feedstocks selected from a group consisting of: natural gas; bio-gas; associated gas; flare gas; gas phase hydrocarbons; and, individual components extracted from natural gas streams.

11. The method according to claim 2, wherein the one or more carbon-containing feedstocks are one or more liquid-phase feedstocks selected from a group consisting of: glycerol by-products from biodiesel production; residual hydrocarbon wastes from petroleum refining; waste fats; and used oils.

12. The method according to claim 2, wherein the one or more carbon-containing feedstocks are one or more solid-phase feedstocks selected from a group consisting of: plastics; agricultural residues; and forest remediation wood.

13. The method according to claim 1, wherein the conversion catalyst substrate is alumina.

14. The method according to claim 4, wherein the redox catalyst comprises a copper lanthanide material containing greater than two weight percent of copper and less than one weight percent of a lanthanide, and wherein the redox catalyst is coated on a high surface area support selected from a group consisting of alumina, silica, carbon and mixtures thereof.

15. The method according to claim 4, wherein the redox catalyst is operated at the same temperature, pressure and space velocity conditions as the conversion catalyst.

* * * * *